US011909514B2

(12) United States Patent
Chen et al.

(10) Patent No.: US 11,909,514 B2
(45) Date of Patent: Feb. 20, 2024

(54) RECONFIGURABLE OPTICAL ADD-DROP MULTIPLEXER, OPTICAL NETWORK, AND OPTICAL SIGNAL PROCESSING METHOD

(71) Applicant: Tencent Technology (Shenzhen) Company Limited, Shenzhen (CN)

(72) Inventors: Minggang Chen, Shenzhen (CN); Fangchao Li, Shenzhen (CN); Yu Wang, Shenzhen (CN); Xiang Li, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 95 days.

(21) Appl. No.: 17/322,695

(22) Filed: May 17, 2021

(65) Prior Publication Data

US 2021/0273740 A1    Sep. 2, 2021

Related U.S. Application Data

(63) Continuation of application No. PCT/CN2020/076074, filed on Feb. 20, 2020.

(30) Foreign Application Priority Data

Mar. 20, 2019   (CN) .......................... 201910214799.7

(51) Int. Cl.
 *H04J 14/02*   (2006.01)
(52) U.S. Cl.
 CPC ...... *H04J 14/0212* (2013.01); *H04J 14/0205* (2013.01)
(58) Field of Classification Search
 CPC .................. H04J 14/0212; H04J 14/0205
 See application file for complete search history.

(56) References Cited

U.S. PATENT DOCUMENTS 7,254,327 B1 * 8/2007 Zhong ................ H04B 10/0775
                                                      709/224
8,879,915 B2 * 11/2014 Sakamoto ........... H04J 14/0217
                                                      398/83

(Continued)

FOREIGN PATENT DOCUMENTS

CN     101227247 A    7/2008
CN     101420286 A    4/2009

(Continued)

OTHER PUBLICATIONS

Tencent Technology, JP Office Action, Japanese Patent Application No. 2021-539986, dated Aug. 16, 2022, 19 pgs.

(Continued)

*Primary Examiner* — Tanya T Motsinger
(74) *Attorney, Agent, or Firm* — Morgan, Lewis & Bockius LLP (57) ABSTRACT

Disclosed are a reconfigurable optical add-drop multiplexer, and an optical signal processing method. The reconfigurable optical add-drop multiplexer includes: at least one optical cross-connect device and at least two optical signal processing devices. Each optical signal processing device includes a wavelength-selective switch and a filter. The wavelength-selective switch is configured to perform wavelength-based allocation on inputted dense wavelength division multiplexing optical signals and input the dense wavelength division multiplexing optical signals into the filter. The filter is configured to separate optical signals outputted by the wavelength-selective switch into single-channel optical signals, and multiplex a plurality of single-channel optical signals outputted by the optical cross-connect device and input the multiplexed single-channel optical signals into the wavelength-selective switch. The wavelength-selective switch is configured to perform wavelength combination on the optical signals outputted by the filter and output the (Continued)

optical signals. The optical cross-connect device includes N upper ports and N lower ports.

10 Claims, 8 Drawing Sheets

(56) References Cited

U.S. PATENT DOCUMENTS

| | | | | |
|---|---|---|---|---|
| 9,106,983 | B2* | 8/2015 | Ji | H04L 12/28 |
| 10,277,352 | B2* | 4/2019 | Chedore | H04J 14/0212 |
| 2003/0020994 | A1* | 1/2003 | Boden | G02B 6/29362 |
| | | | | 398/141 |
| 2003/0185149 | A1* | 10/2003 | Daniell | H04J 3/085 |
| | | | | 370/222 |
| 2003/0185565 | A1* | 10/2003 | Wang | H04J 14/0212 |
| | | | | 398/49 |
| 2004/0042795 | A1* | 3/2004 | Doerr | H04Q 11/0005 |
| | | | | 385/24 |
| 2004/0190901 | A1* | 9/2004 | Fang | H04J 14/0205 |
| | | | | 398/59 |
| 2006/0098981 | A1* | 5/2006 | Miura | H04Q 11/0005 |
| | | | | 398/45 |
| 2009/0041457 | A1* | 2/2009 | Maki | H04J 14/0204 |
| | | | | 398/45 |
| 2009/0232492 | A1* | 9/2009 | Blair | H04J 14/029 |
| | | | | 398/58 |
| 2009/0232497 | A1* | 9/2009 | Archambault | H04J 14/0217 |
| | | | | 398/50 |
| 2010/0014863 | A1* | 1/2010 | Zami | H04J 14/0212 |
| | | | | 398/79 |
| 2011/0038636 | A1 | 2/2011 | Akiyama et al. | |
| 2011/0085803 | A1* | 4/2011 | Ji | H04J 14/0204 |
| | | | | 398/79 |
| 2011/0262143 | A1* | 10/2011 | Ji | H04J 14/0208 |
| | | | | 398/83 |
| 2012/0002964 | A1* | 1/2012 | Takatsu | H04J 14/0212 |
| | | | | 398/83 |
| 2012/0128347 | A1* | 5/2012 | Sakamoto | H04J 14/021 |
| | | | | 398/48 |
| 2012/0183294 | A1* | 7/2012 | Boertjes | H04J 14/0238 |
| | | | | 398/49 |
| 2013/0279900 | A1* | 10/2013 | Kim | H04J 14/0252 |
| | | | | 398/3 |
| 2014/0023373 | A1* | 1/2014 | Tosaki | H04J 14/0212 |
| | | | | 398/83 |
| 2015/0208146 | A1 | 7/2015 | Younce et al. | |
| 2015/0365186 | A1* | 12/2015 | Schimpe | H04J 14/021 |
| | | | | 398/50 |
| 2016/0105250 | A1* | 4/2016 | Rostami | G02B 6/3518 |
| | | | | 398/49 |
| 2017/0104530 | A1 | 4/2017 | Nagata et al. | |

FOREIGN PATENT DOCUMENTS

| | | | | |
|---|---|---|---|---|
| CN | 101610129 | A | 12/2009 | |
| CN | 101809912 | A | 8/2010 | |
| CN | 105474565 | A | 4/2016 | |
| CN | 109802744 | A | 5/2019 | |
| EP | 2403172 | A2 * | 1/2012 | H04J 14/0204 |
| EP | 2615755 | A1 * | 7/2013 | H04J 14/0212 |
| JP | 2006087062 | A | 3/2006 | |
| JP | 2008252664 | A | 10/2008 | |
| JP | 2012114640 | A | 6/2012 | |
| JP | 2013531909 | A | 8/2013 | |
| WO | WO-2010036268 | A1 * | 4/2010 | H04J 14/0204 |

OTHER PUBLICATIONS

Tencent Technology, WO, PCT/CN2020/076074, May 8, 2020, 5 pgs.
Tencent Technology, IPRP, PCT/CN2020/076074, Sep. 16, 2021, 6 pgs.
Extended European Search Report, EP20772828.8, dated Apr. 11, 2022, 12 pgs.
Philip N. Ji et al., "Colorless and Directionless Multi-Degree Reconfigurable Optical Add/Drop Multiplexers", Wireless and Optical Communications Conference (WOCC), 2010 19th Annual, IEEE, Piscataway, NJ, USA, May 14, 2010, XP031709492, 5 pgs.
Steven Gringeri et al., "Flexible Architectures for Optical Transport Nodes and Networks", IEEE Communications Magazine, IEEE Service Center, Piscataway, US, vol. 48, No. 7, Jul. 1, 2010, XP011312222, 11 pgs.
Shota Shimazaki et al., "Cost Comparison of Different ROADM Architectures", 2013 19th Asia-Pacific Conference on Communications (APCC), USA, IEEE, 2013, 4 pgs.
Tencent Technology, JP Office Action, Japanese Patent Application No. 2021-539986, dated Feb. 21, 2023, 20 pgs.
Tencent Technology, ISR, PCT/CN2020/076074, May 8, 2020, 2 pgs.

* cited by examiner

RECONFIGURABLE OPTICAL ADD-DROP MULTIPLEXER, OPTICAL NETWORK, AND OPTICAL SIGNAL PROCESSING METHOD

CROSS REFERENCE TO RELATED APPLICATIONS

This application is a continuation application of PCT Patent Application No. PCT/CN2020/076074, entitled "RECONFIGURABLE OPTICAL ADD-DROP MULTIPLEXER, OPTICAL NETWORK, AND OPTICAL SIGNAL PROCESSING METHOD" filed on Feb. 20, 2020, which claims priority to Chinese Patent Application No. 201910214799.7, filed with the State Intellectual Property Office of the People's Republic of China on Mar. 20, 2019, and entitled "RECONFIGURABLE OPTICAL ADD-DROP MULTIPLEXER, OPTICAL NETWORK, AND OPTICAL SIGNAL PROCESSING METHOD", all of which are incorporated herein by reference in their entirety.

FIELD OF THE TECHNOLOGY

This application relates to the field of optical communication technologies, and in particular, to a reconfigurable optical add-drop multiplexer (ROADM), an optical network, and an optical signal processing method.

BACKGROUND OF THE DISCLOSURE

As an important node structure in networking of an open optical network, a CDC-ROADM can complete optical wavelength routing between nodes and colorless, directionless, and non-blocking dropping of optical signals.

In the related art, a CDC-ROADM in each node implements optical signal dropping and loading through an M:N device, where different M-side ports in the M:N device correspond to different optical signal directions, and N-side ports are connected to an optical transform unit (OTU). In an optical signal dropping direction (M→N), an optical signal entering from an M-side port is outputted from any one or more of the N-side ports; while in an optical signal loading direction (N→M), optical signals entering from any N-side port are combined at any M-side port and outputted.

However, when the CDC-RDADM with the foregoing structure is used, to implement that the optical signals at the M-side ports are outputted from at least one N-side port, 1×N optical splitters need to be disposed at the M-side ports of the M:N device, and an additional optical amplifier array needs to be introduced, to compensate for differential path loss caused by the optical splitters, resulting in a complex structure of the CDC-RDADM.

SUMMARY

Embodiments of this application provide a reconfigurable optical add-drop multiplexer, an optical network, and an optical signal processing method.

A reconfigurable optical add-drop multiplexer is provided, including:
   at least one optical cross-connect device;
   at least two optical signal processing devices corresponding to different optical directions;
   each of the optical signal processing devices including a wavelength-selective switch (WSS) and a filter, the wavelength-selective switch being configured to perform wavelength-based allocation on inputted dense wavelength division multiplexing optical signals and input the dense wavelength division multiplexing optical signals into the filter, the filter being configured to separate the optical signals outputted by the wavelength-selective switch into single-channel optical signals, the filter being configured to multiplex a plurality of single-channel optical signals outputted by the optical cross-connect device and input the single-channel optical signals into the wavelength-selective switch, the wavelength-selective switch being configured to perform wavelength combination on the optical signals outputted by the filter and output multiplexed optical signals; and
   the optical cross-connect device including N upper ports and N lower ports, the optical cross-connect device being connected to the filter in each of the optical signal processing devices through the upper ports, the lower ports being connected to an optical transform unit, the optical cross-connect device being configured to drop the single-channel optical signals outputted by the filter, and input single-channel optical signals outputted by the optical transform unit into the filter through the upper ports.

An optical network is provided, including at least two optical network nodes; and
   each of the optical network nodes being provided with the reconfigurable optical add-drop multiplexer according to the foregoing aspect, the optical network nodes being connected through optical fibers.

An optical signal processing method is provided, performed by a reconfigurable optical add-drop multiplexer, the reconfigurable optical add-drop multiplexer including at least two optical signal processing devices and at least one optical cross-connect device, different optical signal processing devices corresponding to different optical directions, the method including:
   receiving, by a wavelength-selective switch in each optical signal processing device, inputted dense wavelength division multiplexing optical signals;
   performing, by the wavelength-selective switch, wavelength-based allocation on the dense wavelength division multiplexing optical signals, and inputting the optical signals after the wavelength-based allocation into a filter in the optical signal processing device;
   separating, by the filter, the optical signals after the wavelength-based allocation into single-channel optical signals, and inputting the single-channel optical signals into upper ports of the optical cross-connect device; and
   dropping, by the optical cross-connect device, the single-channel optical signals through lower ports.

An optical signal processing method is provided, performed by a reconfigurable optical add-drop multiplexer, the reconfigurable optical add-drop multiplexer including at least two optical signal processing devices and at least one optical cross-connect device, different optical signal processing devices corresponding to different optical directions, the method including:
   receiving, by the optical cross-connect device through lower ports, single-channel optical signals outputted by an optical transform unit;
   inputting, by the optical cross-connect device through upper ports, the single-channel optical signals into a filter in any optical signal processing device;
   multiplexing, by the filter, the inputted more than one single-channel optical signal, and inputting multiplexed optical signals into a wavelength-selective switch in the optical signal processing device; and performing, by the wavelength-selective switch, wavelength combination on the multiplexed optical signals and outputting the optical signals.

Details of one or more embodiments of this application are provided in the accompanying drawings and descriptions below. Other features, objectives, and advantages of this application become apparent from the specification, the drawings, and the claims.

BRIEF DESCRIPTION OF THE DRAWINGS

To better describe and illustrate embodiments in this application, reference may be made to one or more drawings. Additional details or examples used to describe the drawings are not to be considered as limiting the scope of any of the disclosure, currently described embodiments, and the best modes of the present disclosure currently understood.

DESCRIPTION OF EMBODIMENTS

Exemplary embodiments are described in detail herein, and examples of the exemplary embodiments are shown in the accompanying drawings. When the following description involves the accompanying drawings, unless otherwise indicated, the same numerals in different accompanying drawings represent the same or similar elements. The implementations described in the following exemplary embodiments do not represent all implementations that are consistent with this application. On the contrary, the implementations are merely examples of apparatuses and methods that are described in detail in the appended claims and that are consistent with some aspects of this application. It can be understood that the term "a plurality of" mentioned in the embodiments of this application means "more than one" unless otherwise specified.

To facilitate understanding, the following explains terms involved in the embodiments of this application.

Dense wavelength division multiplexing (DWDM): a technology in which a plurality of optical signals of different wavelengths are multiplexed onto the same optical fiber for transmission. Correspondingly, DWDM optical signals include optical signals of different wavelengths.

Reconfigurable optical add-drop multiplexer: a device used to complete dynamic wavelength (optical signal) dropping and wavelength routing in a DWDM system.

Single-channel optical signal: when a channel is a single-wavelength channel, the single-channel optical signal is a single-wavelength optical signal; and when the channel is a superchannel including a plurality of wavelengths, the single-channel optical signal is a multi-wavelength optical signal.

Figure 1:
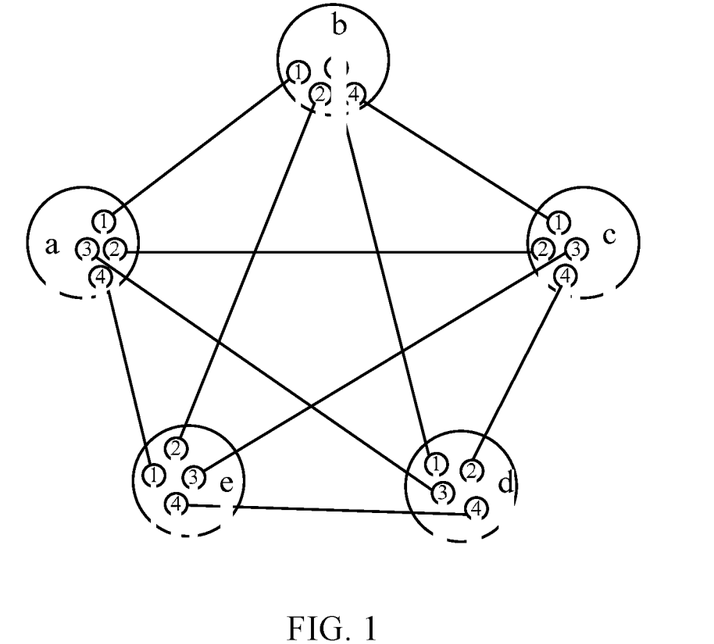
FIG. 1 is an exemplary topological structure diagram of an optical network.

FIG. 1 is an exemplary topological structure diagram of an optical network. The optical network includes five optical network nodes: a, b, c, d, and e.

In FIG. 1, the optical network nodes are connected to each other through a point-to-point system. In this connection mode, optical signal routing cannot be implemented between optical network nodes, not to mention dropping of optical signals of any wavelength in any direction. To enable the optical network to have a wavelength routing function, that is, to allow optical signals to be routed between different optical network nodes and to implement a function of dropping optical signals of any wavelength in any direction, a CDC-ROADM needs to be disposed in each optical network node.

Figure 2:
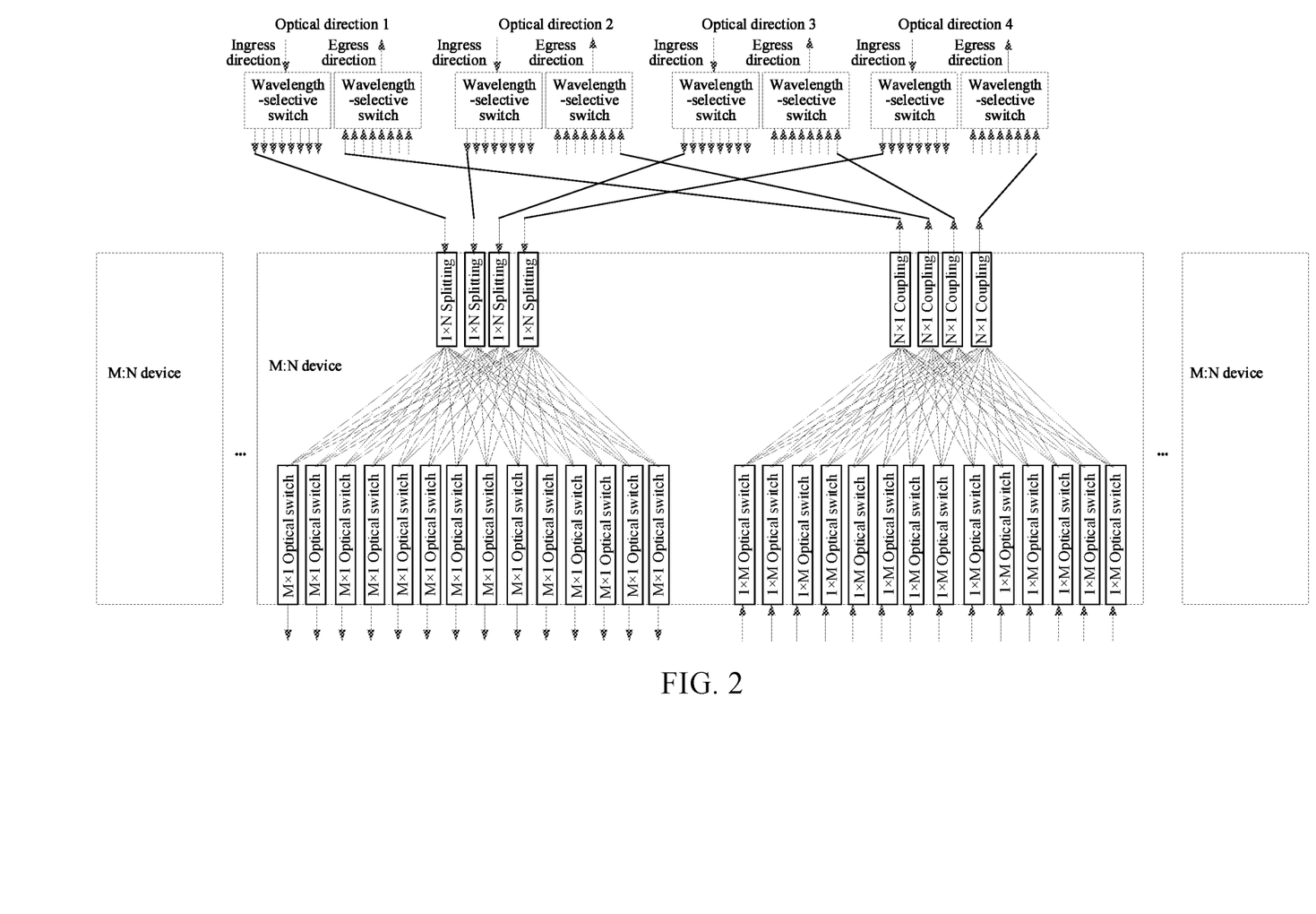
FIG. 2 is a schematic structural diagram of a CDC-ROADM in the related art.

In the related art, a CDC-ROADM disposed in an optical network node is shown in FIG. 2.

In the CDC-ROADM shown in FIG. 2, in each optical direction, wavelength-based allocation is performed on optical signals in an ingress direction and in an egress direction respectively through two wavelength-selective switches, and M:N devices in the CDC-ROADM are configured to implement the function of dropping optical signals in different optical directions.

The working principle of the M:N device is as follows: in an M→N direction, DWDM optical signals entering from M-side ports are outputted through any one or more of N-side ports; in an N→M direction, DWDM optical signals entering from any N-side port may be combined to any M-side port and outputted.

After the CDC-ROADM of the foregoing structure is applied to the optical network node, a wavelength group (that is, a combination of optical signals of different wavelengths) entering the M-side ports of the M:N device can be controlled through the wavelength-selective switch in each optical direction, and wavelength groups received at the M-side ports are allocated to the N-side ports through the M:N device, thereby receiving single-wavelength optical signals through a coherent receiving function of an optical transform unit (OTU) connected to the N-side ports, and implementing colorless, directionless, and non-blocking optical signal dropping.

To implement the optical signal dropping in the M→N direction, as shown in FIG. 2, a 1×N optical splitter needs to be added at each M-side port of the M:N device, (to implement optical splitting from a single M-side port to all N-side ports), and correspondingly, each N-side port of the M:N device selects one of the M channels as an optical signal output through an M×1 optical switch.

To implement the optical signal loading in the N→M direction, as shown in FIG. 2, a 1×M optical switch needs to be configured at each N-side port of the M:N device (to select an M-side port to which an optical signal is outputted), and N×1 coupling devices are configured at the M-side ports, so as to implement optical signal coupling at different N-side ports by using the N×1 coupling devices.

After the optical splitters are used in the M:N device, differential path loss in the M→N direction is proportional to a quantity of ports of the optical splitters, that is, a larger quantity of ports of the splitters corresponds to greater differential path loss. Generally, there are 80 optical signals in each optical direction in the DWDM system. If a single M:N device is used to implement the optical signal dropping, a 1×80 optical splitter needs to be configured to perform optical splitting on optical signals inputted from the M-side ports, which results in great differential path loss.

To compensate for the path loss caused by the optical splitters, an optical amplifier array may be additionally provided in the M:N device to compensate for the optical signals after the optical splitting, or a plurality of M:N devices may be used to implement the optical signal dropping (that is, using a plurality of optical splitters with fewer ports).

However, the additional optical amplifier arrays increase the complexity of the CDC-ROADM structure, thereby increasing a failure rate of the entire system. The use of a plurality of M:N devices increases a quantity of occupied ports in the wavelength-selective switch in the optical direction, and each time a port of the wavelength-selective switch is occupied, an extendible optical direction is reduced, which is not conducive to the subsequent expansion of the system.

In the reconfigurable optical add-drop multiplexer provided in the embodiments of this application, a corresponding optical signal processing device is provided for each optical direction, so that inputted dense wavelength division multiplexing optical signals are separated into single-channel optical signals through a wavelength-selective switch and a filter in the optical signal processing device, and single-wavelength optical signals or multi-wavelength optical signals outputted by the optical signal processing device are dropped through an optical cross-connect device, thereby implementing a colorless, directionless, and non-blocking optical signal dropping function. Since the reconfigurable optical add-drop multiplexer in the embodiments of this application does not use optical splitters, the differential path loss caused by optical splitters can be avoided; moreover, the used single optical cross-connect device can implement the dropping of optical signals of each wavelength in each optical direction, and fewer ports of the wavelength-selective switch in the optical direction are occupied, which is conducive to the subsequent expansion of the system. The following describes the reconfigurable optical add-drop multiplexer provided in the embodiments of this application by using an exemplary embodiment.

Figure 3:
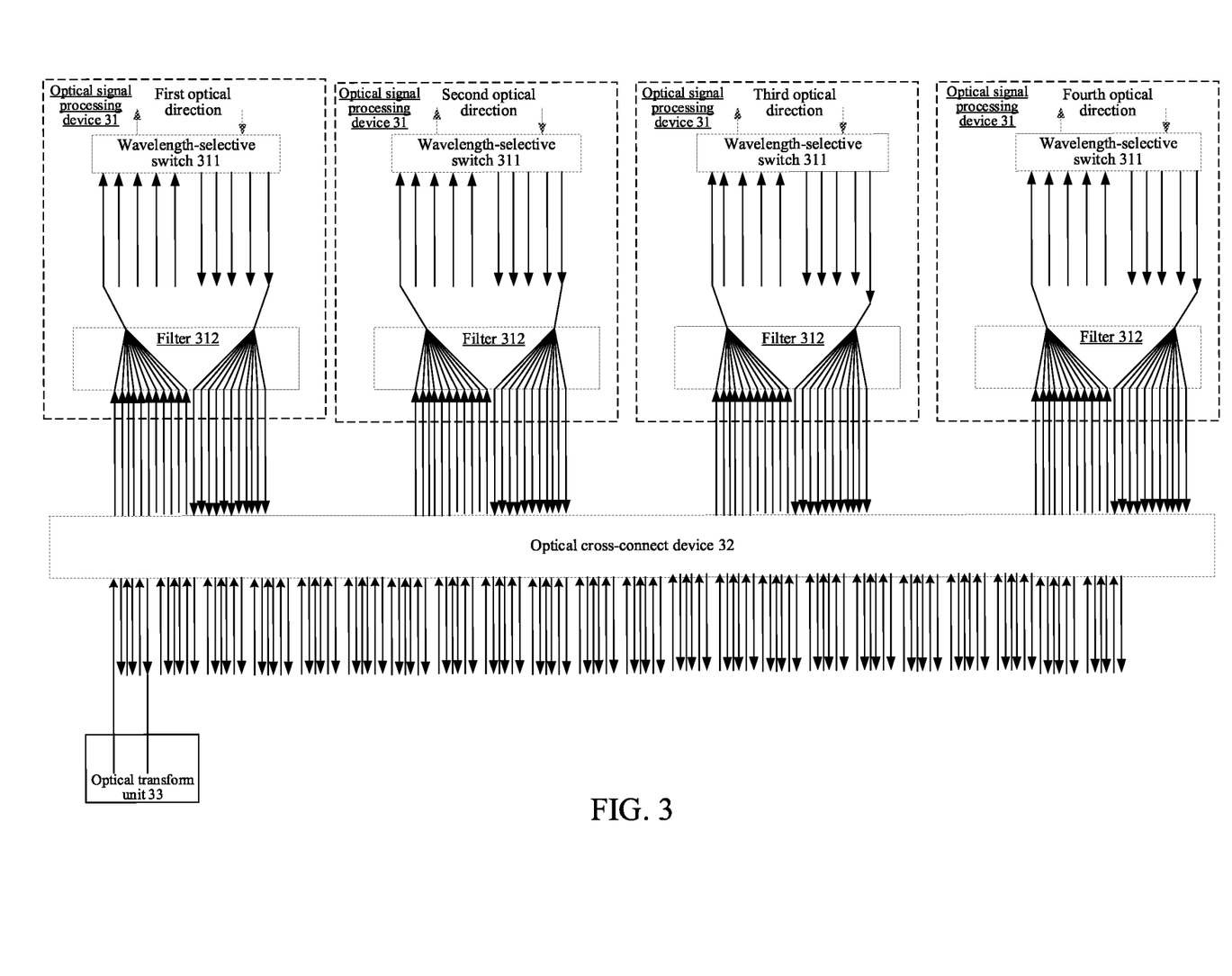
FIG. 3 is a schematic structural diagram of a reconfigurable optical add-drop multiplexer according to an embodiment of this application.

FIG. 3 is a schematic structural diagram of a reconfigurable optical add-drop multiplexer according to an embodiment of this application. The reconfigurable optical add-drop multiplexer includes at least two optical signal processing devices 31 and at least one optical cross-connect device 32.

In an embodiment, an optical direction is used to indicate a path between optical network nodes in an optical network. Using the optical network shown in FIG. 1 as an example, an optical network node a corresponds to four optical directions, where a first optical direction refers to a path from the optical network node a to an optical network node b, and a second optical direction refers to a path from the optical network node a to an optical network node c, a third optical direction refers to a path from the optical network node a to an optical network node d, and a fourth optical direction refers to a path from the optical network node a to an optical network node e.

In this embodiment, different optical signal processors 31 correspond to different optical directions, that is, different optical signal processors 31 are configured to process optical signals in different optical directions. For example, the reconfigurable optical add-drop multiplexer shown in FIG. 3 is applied to the optical network node a shown in FIG. 1, the first optical signal processing device 31 is configured to process optical signals between the optical network node a and the optical network node b, the second optical signal processing device 31 is configured to process optical signals between the optical network node a and the optical network node c, the third optical signal processing device 31 is configured to process optical signals between the optical network node a and the optical network node d, and the fourth optical signal processing device 31 is configured to process optical signals between the optical network node a and the optical network node e. In this embodiment of this application, that the optical network node corresponds to four optical directions is only used as an example for description, which does not constitute a limitation.

In an embodiment, in a single-fiber unidirectional DWDM system, each optical direction of an optical network node may include an ingress direction and an egress direction, where the ingress direction is an optical signal incident direction (that is, a downlink direction of optical signals) of the optical network node, and the egress direction is an optical signal emergent direction (that is, an uplink direction of optical signals) of the optical network node. For example, as shown in FIG. 1, the first optical direction of the optical network node a includes an egress direction of a→b and an ingress direction of b→a.

As shown in FIG. 3, each optical signal processing device 31 includes a wavelength-selective switch 311 and a filter 312.

In a possible implementation, in the downlink direction, the wavelength-selective switch 311 is configured to perform wavelength-based allocation on inputted dense wavelength division multiplexing optical signals and input the dense wavelength division multiplexing optical signals into the filter 312, and the filter 312 is configured to separate the optical signals outputted by the wavelength-selective switch 311 into single-channel optical signals.

In the uplink direction, the filter 312 is configured to multiplex a plurality of single-channel optical signals outputted by the optical cross-connect device 32 and input the multiplexed single-channel optical signals into the wavelength-selective switch 311, and the wavelength-selective switch 311 is configured to perform wavelength combination on the optical signals outputted by the filter 312 and output the optical signals.

Different from the use of M:N devices in the related art to implement dropping of optical signals, at least one optical cross-connect device is used in this embodiment of this application to implement dropping of optical signals in different optical directions. The optical cross-connect device includes N upper ports and N lower ports, and through configuration, any of the upper ports may be connected to any of the lower ports in a one-to-one manner (the upper ports cannot be connected to each other in a one-to-one manner, and the lower ports cannot be connected to each other in a one-to-one manner). The optical cross-connect device is connected to the filters in all the optical directions through the N upper ports, and connected to the optical transform unit through the lower ports.

For example, as shown in FIG. 3, the filters 312 in the first optical direction, the second optical direction, the third optical direction, and the fourth optical direction are all connected to the upper ports of the optical cross-connect device 32, and the lower ports of the optical cross-connect device 32 are connected to the optical transform unit 33.

In an embodiment, when the optical cross-connect device is used to drop optical signals, a single-channel optical signal outputted by a filter is inputted to the upper port of the optical cross-connect device, and the optical cross-connect device outputs the single-channel optical signal into the connected optical transform unit through any lower port, to implement dropping of the optical signal.

When the foregoing optical cross-connect device is used, any lower port may be connected to any one of the upper ports through control (for example, a configuration instruction is sent to the optical cross-connect device, and the optical cross-connect device connects a lower port with a designated upper port according to the configuration instruction), and the upper ports are connected to the filters corresponding to different optical directions. Therefore, when receiving a single-channel optical signal outputted by the optical transform unit, the lower port may transmit the single-channel optical signal to any one of the upper ports, so that the single-channel optical signal enters any optical direction to implement directionless optical signal dropping. Meanwhile, since the single-channel optical signal can enter any filter channel in any direction, colorless optical signal dropping can be implemented.

In addition, since quantities of the upper ports and the lower ports of the optical cross-connect device are the same, the lower ports can form a 1:1 full mapping with the upper ports, that is, there is no conflict between different channels in different directions, thereby implementing non-blocking optical signal dropping.

Based on the above, in the reconfigurable optical add-drop multiplexer provided in the embodiments of this application, a corresponding optical signal processing device is provided for each optical direction, so that inputted dense wavelength division multiplexing optical signals are separated into single-channel optical signals through the wavelength-selective switches and the filters in the optical signal processing devices, and single-channel optical signals outputted by the optical signal processing devices are dropped through the optical cross-connect device, thereby implementing a colorless, directionless, and non-blocking optical signal dropping function. The reconfigurable optical add-drop multiplexer provided in this embodiment of this application does not need to be provided with an optical splitter, and there is no need to introduce an additional optical amplifier array, so that the structural complexity of the reconfigurable optical add-drop multiplexer is reduced while differential path loss is minimized.

In addition, by introducing a filter in each optical direction, wavelength separation of DWDM optical signals in each optical direction is implemented, and other wavelengths that cause interference to the current channel can be removed through filtering, so that the reconfigurable optical add-drop multiplexer can support dropping of optical signals of incoherent wavelengths.

Figure 4:
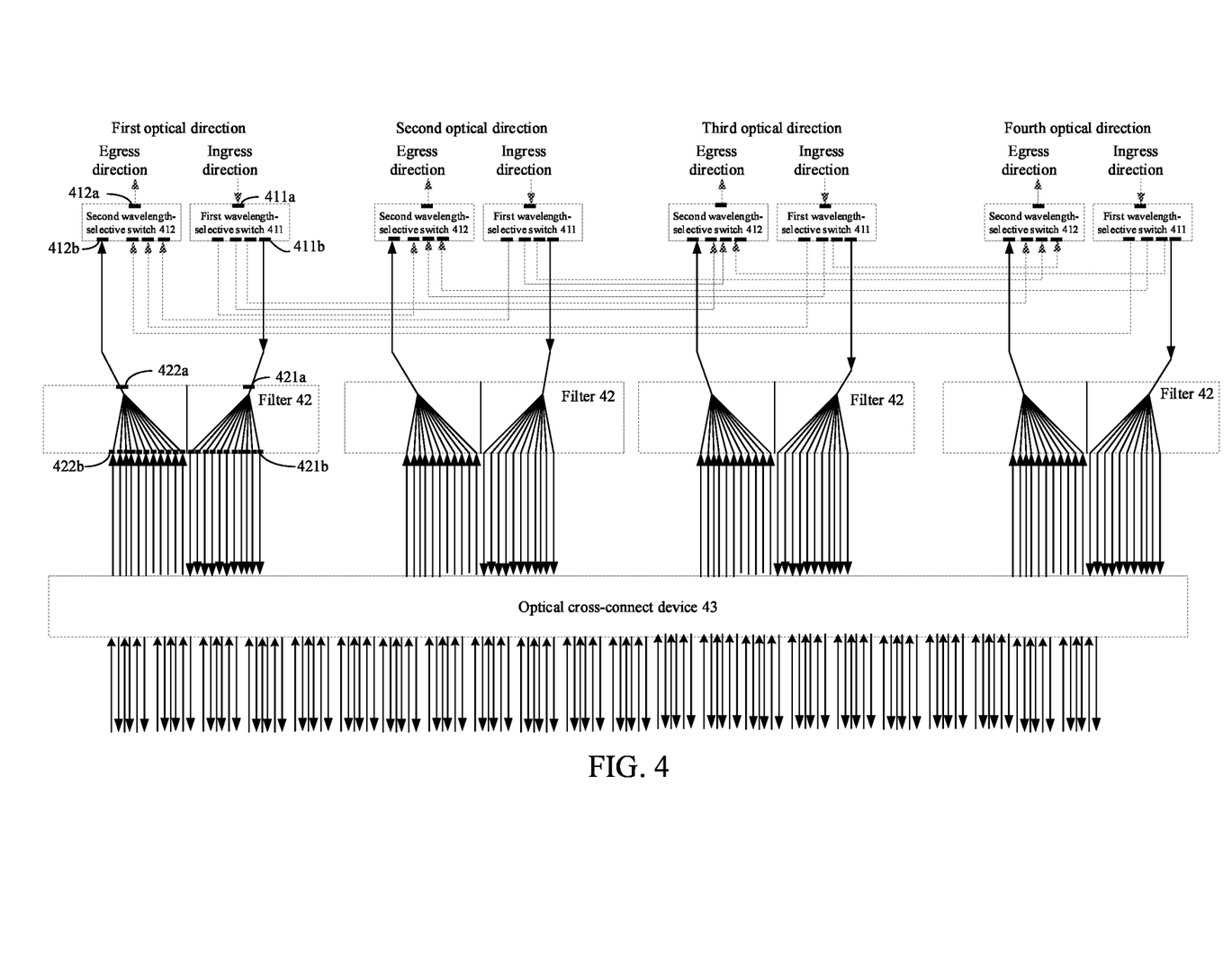
FIG. 4 is a schematic structural diagram of a reconfigurable optical add-drop multiplexer according to another embodiment of this application.

In the single-fiber unidirectional DWDM system, since each optical direction includes an egress direction and an ingress direction, in a possible implementation, each wavelength-selective switch includes a first wavelength-selective switch and a second wavelength-selective switch that are configured to process optical signals in the egress direction and in the ingress direction respectively. FIG. 4 is a schematic structural diagram of a reconfigurable optical add-drop multiplexer according to another embodiment of this application.

As shown in FIG. 4, each optical direction includes a first wavelength-selective switch 411 and a second wavelength-selective switch 412. The first wavelength-selective switch 411 includes a first input port 411*a* and a plurality of first output ports 411*b*. The first wavelength-selective switch 411 is configured to receive, through the first input port 411*a*, DWDM optical signals inputted in an ingress direction, and allocate the DWDM optical signals to different first output ports 411*b* according to wavelengths.

The second wavelength-selective switch 412 includes a second output port 412*a* and a plurality of second input ports 412*b*. The second wavelength-selective switch 412 is configured to combine optical signals inputted from all the second input ports 412*b* into DWDM optical signals, and output the DWDM optical signals in an egress direction through the second output port 412*a*, thereby transmitting the DWDM optical signals to optical network node corresponding to the optical direction.

The dense wavelength division multiplexing optical signals received by the first wavelength-selective switch 411 and the dense wavelength division multiplexing optical signals outputted by the second wavelength-selective switch 412 are the same type of optical signals, and content included in the optical signals may be different.

In an embodiment, the optical signal allocated to the first output port by the first wavelength-selective switch is a single-channel optical signal, and the single-channel optical signal is single-wavelength optical signal, or a multi-wavelength (superchannel) optical signal including a plurality of wavelengths.

To implement wavelength routing between different optical directions, in a possible implementation, when the reconfigurable optical add-drop multiplexer corresponds to m optical directions, m−1 first output ports in the first wavelength-selective switch in each optical direction are each connected to one of the second input ports in the second wavelength-selective switch in each of other optical directions in a one-to-one manner.

For example, when the reconfigurable optical add-drop multiplexer corresponds to four optical directions, using a first optical direction as an example, one first output port in the first wavelength-selective switch in the first optical direction is connected to one second input port in the second wavelength-selective switch in the second optical direction; another first output port in the first wavelength-selective switch in the first optical direction is connected to one second input port in the second wavelength-selective switch in the third optical direction; still another first output port in the first wavelength-selective switch in the first optical direction is connected to one second input port in the second wavelength-selective switch in the fourth optical direction, that is, three first output ports in the first wavelength-selective switch in the first optical direction are connected to second input ports in second wavelength-selective switches in other optical directions.

Figure 5:
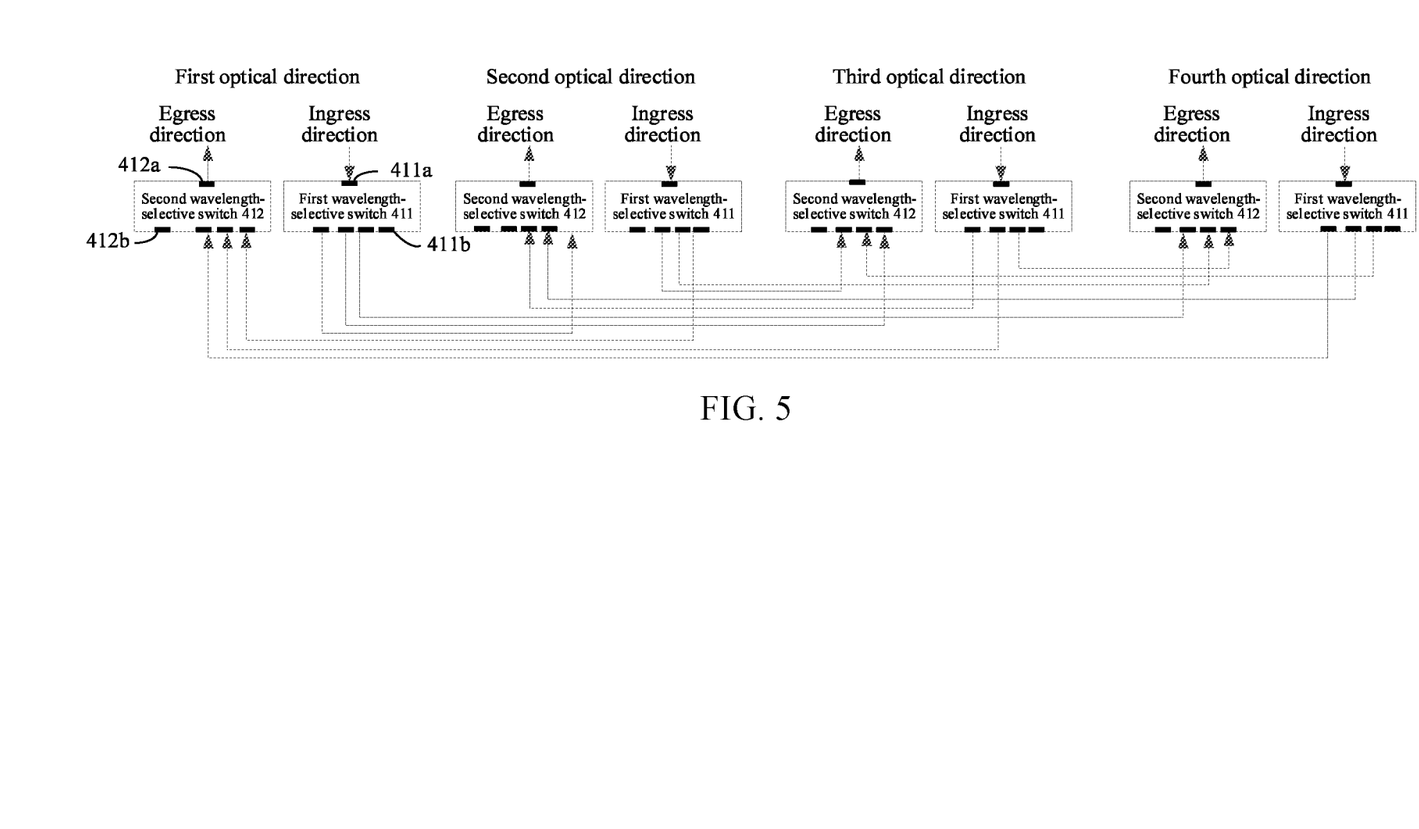
FIG. 5 is a schematic diagram of connections between wavelength-selective switches corresponding to optical directions in FIG. 4.

For example, as shown in FIG. 5, in the first optical direction, three first output ports 411*b* of the first wavelength-selective switch 411 are respectively connected to the second input port 412*b* of the second wavelength-selective switch 412 in the second optical direction, the second input port 412*b* of the second wavelength-selective switch 412 in the third optical direction, and the second input port 412*b* of the second wavelength-selective switch 412 in the fourth optical direction. After this connection mode is used, optical signals separated from the first optical direction can be routed to the second, third, and fourth optical directions, implementing wavelength routing between different optical directions.

When wavelength routing in more optical directions is needed, more WSS ports of the wavelength-selective switches need to be occupied.

Corresponding to the wavelength-selective switch, as shown in FIG. 4, the filter 42 in each optical direction includes: a downlink input port 421a, a plurality of downlink output ports 421b corresponding to the downlink input port 421a, an uplink output port 422a, and a plurality of uplink input ports 422b corresponding to the uplink output port 422a.

The downlink input port 421a is connected to the first output port 411b of the first wavelength-selective switch 411, and the downlink output ports 421b are connected to the upper ports of the optical cross-connect device 43. In the ingress direction (downlink direction) of the optical signals, the filter 42 separates the optical signals (the DWDM optical signals allocated according to wavelengths) outputted from the first output ports 411b (of the first wavelength-selective switch 411) into a plurality of single-channel optical signals, and outputs the single-channel optical signals into the upper ports of the optical cross-connect device 43 through the plurality of downlink output ports 421b.

The uplink output port 422a is connected to the second input port 412b of the second wavelength-selective switch 412, and the uplink input ports 422b are connected to the upper ports of the optical cross-connect device 43. In the egress direction (uplink direction) of the optical signals, the filter 42 multiplexes the single-channel optical signals inputted from the plurality of uplink input ports 422b to the same optical channel (that is, combined into the same optical fiber), and outputs the multiplexed optical signals into the second input port 412b through the uplink output port 422a.

In an embodiment, since the input ends of the second wavelength-selective switch are respectively connected to the filter and first wavelength-selective switches corresponding to other optical directions, the second wavelength-selective switch can combine optical signals in all the optical directions into DWDM optical signals and output the DWDM optical signals.

In an embodiment, the filter may be a fixed filter or a tunable filter. When a fixed filter is used, the wavelength of each port of the filter is fixed; and when a tunable filter is used, the wavelength of each port of the filter is configurable.

In a possible implementation, when one optical cross-connect device is disposed in the reconfigurable optical add-drop multiplexer, in each optical direction, the uplink input ports of the filter are connected to upper ports of the optical cross-connect device in a one-to-one manner, thereby transmitting the separated single-channel optical signals to the optical cross-connect device; the downlink output ports of the filter are connected to upper ports of the optical cross-connect device in a one-to-one manner, thereby receiving the single-channel optical signals inputted by the optical transform unit through the lower ports of the optical cross-connect device.

In an embodiment, the quantity of ports of the optical cross-connect device used in the reconfigurable optical add-drop multiplexer is related to the quantity of optical directions and the quantity of wavelengths corresponding to each optical direction. In a possible implementation, when the reconfigurable optical add-drop multiplexer includes one optical cross-connect device, there are m optical directions, and each optical direction corresponds to optical signals of n wavelengths, the optical cross-connect device is provided with m×n upper ports and m×n lower ports.

In an embodiment, the first wavelength-selective switch includes at least m first output ports, the second wavelength-selective switch includes at least m second input ports, and the filter includes at least n uplink input ports and at least n downlink output ports.

In an example, a 2560:2560 optical cross-connect device is disposed in the reconfigurable optical add-drop multiplexer to implement access of optical signals of 64 wavelengths in each of 20 optical directions.

In this embodiment, the use of an N:N optical cross-connect device can significantly increase the quantity of dropping ports and implement multi-wavelength dropping by using a single device; meanwhile, the use of a single optical cross-connect device can reduce the quantity of occupied ports of the wavelength-selective switch in each optical direction. For a wavelength-selective switch with a limited quantity of ports, more ports of the wavelength-selective switch can be used to implement routing between different optical directions, which helps improve the expandability of the system.

In the embodiment shown in FIG. 4, since only one optical cross-connect device is provided in the reconfigurable optical add-drop multiplexer, all ports of the filters are connected to the optical cross-connect device. However, when this structure is used, the failure of the optical cross-connect device results in the failure of the optical signal dropping in all optical directions.

To improve the reliability of the reconfigurable optical add-drop multiplexer, in a possible implementation, i optical cross-connect devices are provided in the reconfigurable optical add-drop multiplexer.

In an embodiment, when i optical cross-connect devices are provided, upper ports of each of the optical cross-connect devices are connected to a target quantity of uplink input ports in the filter in a one-to-one manner, and the target quantity of uplink input ports accounts for 1/i of a total of uplink input ports in the filter; and the upper ports of each of the optical cross-connect devices are connected to a target quantity of downlink output ports in the filter in a one to-one manner, and the target quantity of downlink output ports accounts for 1/i of a total of downlink output ports in the filter.

Figure 6:
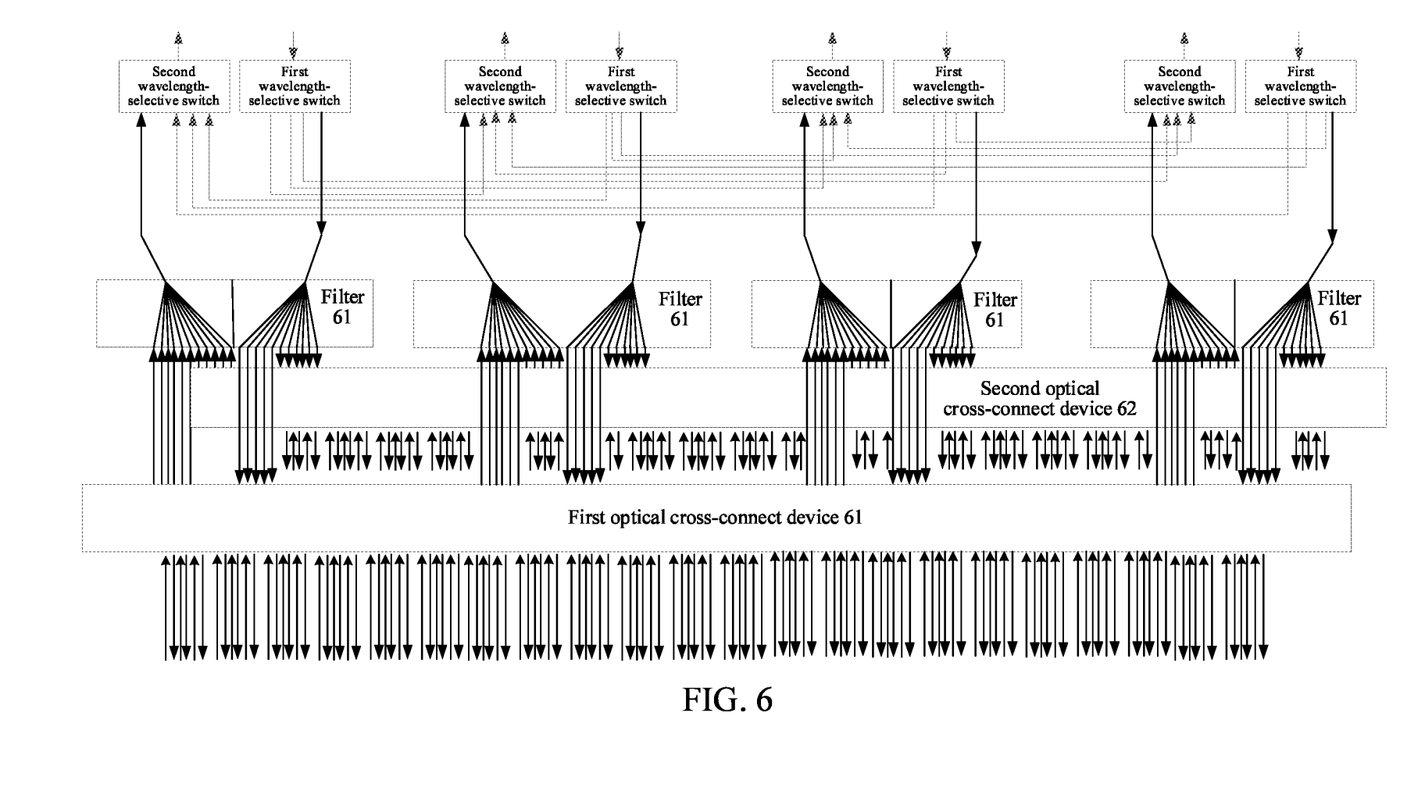
FIG. 6 is a schematic structural diagram of a reconfigurable optical add-drop multiplexer according to another embodiment of this application.

In an exemplary example, as shown in FIG. 6, when two optical cross-connect devices: a first optical cross-connect device 61 and a second optical cross-connect device 62 respectively, are disposed in the reconfigurable optical add-drop multiplexer, half of uplink input ports of a filter 61 in each optical direction are connected to upper ports of the first optical cross-connect device 61, and the other half of the uplink input ports are connected to upper ports of the second optical cross-connect device 62; and half of downlink output ports of the filters 61 in each optical direction are connected to the upper ports of the first optical cross-connect device 61, and the other half of the downlink output ports are connected to the upper ports of the second optical cross-connect device 62.

In an embodiment, when the reconfigurable optical add-drop multiplexer is provided with i optical cross-connect devices, there are m optical directions, and each optical direction corresponds to optical signals of 64 wavelengths, each optical cross-connect device is provided with m×n/i upper ports and m×n/i lower ports.

In an exemplary example, to implement the access of optical signals of 64 wavelengths in each of 20 optical directions, two 1280:1280 optical cross-connect devices may be disposed in the reconfigurable optical add-drop multiplexer, or four 640:640 optical cross-connect devices may be disposed in the reconfigurable optical add-drop multiplexer.

In this embodiment, after a plurality of optical cross-connect devices are disposed in the reconfigurable optical add-drop multiplexer, even if some of the cross-connect devices fail, the system can complete wavelength access through the optical cross-connect devices without an optical failure, to ensure the availability of the system, thereby avoiding the problem that when only a single optical cross-connect device is disposed, the entire system is unavailable due to the failure of the optical cross-connect device.

A processing procedure of uplink optical signals is described below with an exemplary embodiment.

Figure 7:
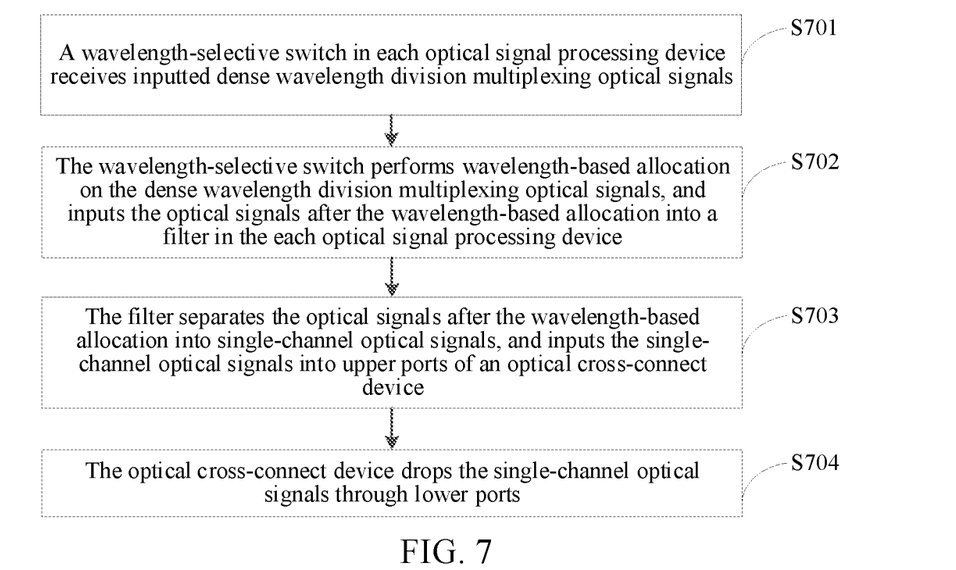
FIG. 7 is a flowchart of an optical signal processing method according to an embodiment.

FIG. 7 is a flowchart of an optical signal processing method according to an embodiment. The method is used in the reconfigurable optical add-drop multiplexer according to the foregoing embodiments. The method includes the following steps.

Step S701. A wavelength-selective switch in each optical signal processing device receives inputted dense wavelength division multiplexing optical signals.

In an optical network, reconfigurable optical add-drop multiplexers of different optical network nodes are connected through optical fibers. When a current optical network node drops an optical signal transmitted by another optical network node (that is, an optical signal downlink process), a wavelength-selective switch in the corresponding optical direction first receives the optical signal transmitted by the optical network node, where the optical signal may be a DWDM optical signal.

In a possible implementation, the wavelength-selective switch includes a first wavelength-selective switch for processing optical signals in an ingress direction, the first wavelength-selective switch includes a first input port and a plurality of first output ports, and the first wavelength-selective switch receives, through the first input port, the DWDM optical signals inputted in the ingress direction.

Step S702. The wavelength-selective switch performs wavelength-based allocation on the dense wavelength division multiplexing optical signals, and input the optical signals after the wavelength-based allocation into a filter in the optical signal processing device.

Corresponding to the foregoing step, in a possible implementation, the first wavelength-selective switch allocates the received DWDM optical signals to different first output ports according to wavelengths, so that the optical signals are inputted into the filter through the first output port.

In an embodiment, the first wavelength-selective switch may further transmit wavelength-allocated optical signals to second wavelength-selective switches corresponding to other optical directions through the first output ports, to implement the optical signal routing.

Step S703. The filter separates the optical signals after the wavelength-based allocation into single-channel optical signals, and input the single-channel optical signals into upper ports of an optical cross-connect device.

In a possible implementation, in the downlink direction, the filter includes a downlink input port and a plurality of downlink output ports corresponding to the downlink input port. The filter receives, through the downlink input port, the wavelength-allocated optical signals outputted by the wavelength-selective switch, and separates the optical signals into multiple single-channel optical signals (single-wavelength optical signals or multi-wavelength optical signals), so that the separated single-channel optical signals are inputted into the upper ports of the optical cross-connect device through the plurality of downlink output ports.

Step S704. The optical cross-connect device drops the single-channel optical signals through lower ports.

Since the filters corresponding to different optical directions are all connected to the upper ports of the optical cross-connect device, the optical cross-connect device can receive single-channel optical signals from a plurality of optical directions, and further implement the dropping of optical signals in different optical directions by controlling connections between the upper ports and the lower ports.

Figure 8:
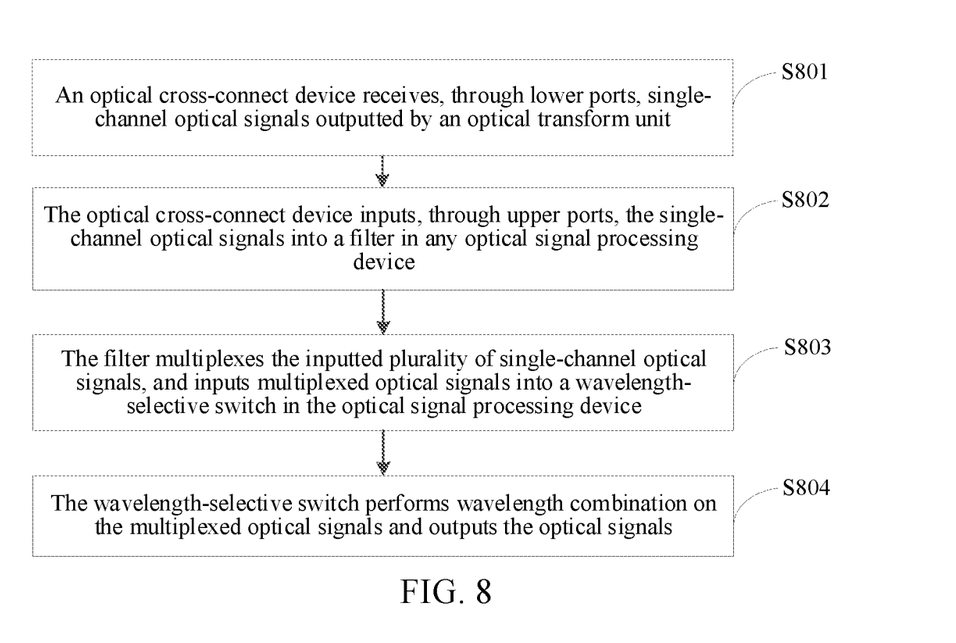
FIG. 8 is a flowchart of an optical signal processing method according to another embodiment.

Corresponding to the processing procedure of the uplink optical signals, the processing procedure of the downlink optical signals is shown in FIG. 8.

FIG. 8 is a flowchart of an optical signal processing method according to another embodiment. The method is used in the reconfigurable optical add-drop multiplexer according to the foregoing embodiments. The method includes the following steps.

Step S801. An optical cross-connect device receives, through lower ports, single-channel optical signals outputted by an optical transform unit.

The lower ports of the optical cross-connect device are connected to the optical transform unit of the optical network node. When a current optical network node needs to transmit optical signals to other optical network nodes, optical signals (single-channel optical signals) are inputted to the lower ports of the optical cross-connect device through the optical transform unit.

Step S802. The optical cross-connect device inputs, through upper ports, the single-channel optical signals into a filter in any optical signal processing device.

In an embodiment, in the optical cross-connect device, because the lower ports may be connected to any upper ports, the optical cross-connect device can input the single-channel optical signals into the filter in any optical direction, so that the single-channel optical signals can be transmitted to any optical direction.

Step S803. The filter multiplexes the inputted plurality of single-channel optical signals, and input multiplexed optical signals into a wavelength-selective switch in the optical signal processing device.

In a possible implementation, the wavelength-selective switch includes a second wavelength-selective switch for processing optical signals in the egress direction, the filter includes a plurality of uplink input ports and an uplink output port corresponding to the plurality of uplink input ports, the uplink input ports are connected to the upper ports of the optical cross-connect device, and the uplink output port is connected to the second input port of the second wavelength-selective switch. The filter multiplexes single-channel optical signals inputted from the plurality of uplink input ports to the same optical channel, and outputs the multiplexed optical signals into the second input port of the second wavelength-selective switch through the uplink output port.

Step S804. The wavelength-selective switch performs wavelength combination on the multiplexed optical signals and outputs the optical signals.

In a possible implementation, when the second wavelength-selective switch is connected to first wavelength-selective switches in other optical directions to implement wavelength routing, the second wavelength-selective switch performs wavelength combination on optical signals in the current optical direction and in other optical directions (received through a plurality of second input ports), to output combined DWDM optical signals.

The combined optical signals are transmitted through an optical fiber to the optical network node in the corresponding optical direction, and the optical network node, through the reconfigurable optical add-drop multiplexer, drops the optical signals by using the optical signal processing method shown in FIG. 7.

Figure 9:
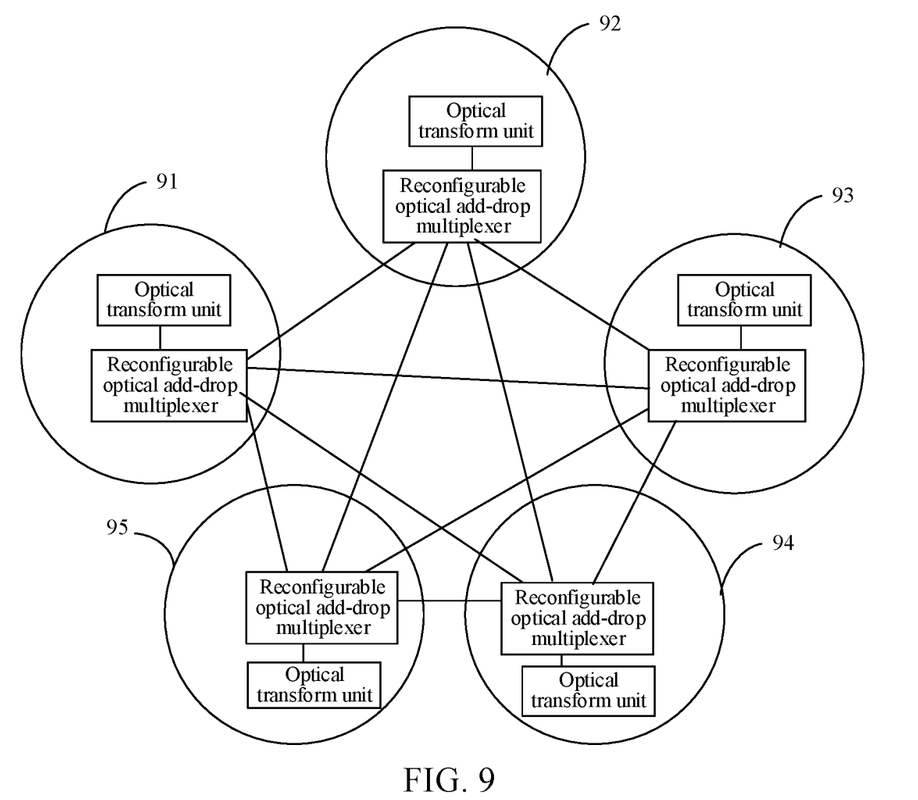
FIG. 9 is a schematic structural diagram of an optical network according to an embodiment of this application.

FIG. 9 is a schematic structural diagram of an optical network according to an embodiment. The optical network includes at least two optical network nodes. In FIG. 9, the optical network including a first optical network node 91, a second optical network node 92, a third optical network node 93, a fourth optical network node 94, and a fifth optical network node 95 is used as an example for description.

As shown in FIG. 9, each optical network node in the optical network is provided with a reconfigurable optical add-drop multiplexer, and the reconfigurable optical add-drop multiplexer may be any reconfigurable optical add-drop multiplexer according to the foregoing embodiments.

The optical network nodes are connected through the reconfigurable optical add-drop multiplexers and optical fibers between the optical network nodes. In an uplink direction, optical signals outputted by an optical transform unit in the optical network node can be transmitted to any optical network node in the optical network through the reconfigurable optical add-drop multiplexer. In a downlink direction, the optical network node can input optical signals from each optical direction into the optical transform unit through the reconfigurable optical add-drop multiplexer, to finally implement wavelength routing between different optical directions, and the wavelength-independent, direction-independent, and non-blocking optical signal dropping.

After considering the specification and practicing the present disclosure, a person skilled in the art may easily conceive of other implementations of this application. This application is intended to cover any variations, uses, or adaptive changes of this application. These variations, uses, or adaptive changes follow the general principles of this application and include common general knowledge or common technical means in the art, which are not disclosed in this application. The specification and the embodiments are considered as merely exemplary, and the scope and spirit of this application are pointed out in the following claims.

It is to be understood that this application is not limited to the precise structures described above and shown in the accompanying drawings, and various modifications and changes can be made without departing from the scope of this application. The scope of this application is subject only to the appended claims.

What is claimed is:

1. A reconfigurable optical add-drop multiplexer, comprising:
   at least one optical cross-connect device;
   at least two optical signal processing devices corresponding to different optical directions;
   each of the optical signal processing devices comprising a wavelength-selective switch and a filter, the wavelength-selective switch being configured to perform wavelength-based allocation on inputted dense wavelength division multiplexing optical signals and input the dense wavelength division multiplexing optical signals into the filter, the filter being configured to separate the optical signals outputted by the wavelength-selective switch into single-channel optical signals, the filter being configured to multiplex a plurality of single-channel optical signals outputted by the optical cross-connect device and input the multiplexed single-channel optical signals into the wavelength-selective switch, the wavelength-selective switch being configured to perform wavelength combination on the optical signals outputted by the filter and output the optical signals; and the optical cross-connect device comprising N upper ports and N lower ports, the optical cross-connect device being connected to the filters in the optical signal processing devices through the upper ports, the lower ports being connected to an optical transform unit, the optical cross-connect device being configured to drop the single-channel optical signals outputted by the filters, and input single-channel optical signals outputted by the optical transform unit into the filters through the upper ports, wherein:
   the at least one optical cross-connect device comprise i optical cross-connect devices, i being an integer greater than 1;
   the upper ports of each of the optical cross-connect devices are connected to a target quantity of uplink input ports in the filter in a one-to-one manner, and the target quantity of uplink input ports accounts for 1/i of a total of uplink input ports in the filter;
   the upper ports of each of the optical cross-connect devices are connected to a target quantity of downlink output ports in the filter in a one-to-one manner, and the target quantity of downlink output ports accounts for 1/i of a total of downlink output ports in the filter;
   N=m×n÷i, wherein the reconfigurable optical add-drop multiplexer corresponds to m optical directions and each optical direction corresponds to optical signals of n wavelengths;
   the wavelength-selective switch comprises a first wavelength-selective switch and a second wavelength-selective switch;
   the first wavelength-selective switch comprises a first input port and more than one first output port, and the first wavelength-selective switch is configured to receive, through the first input port, the dense wavelength division multiplexing optical signals inputted in an ingress direction, and allocate the dense wavelength division multiplexing optical signals to different first output ports according to wavelengths; and
   the second wavelength-selective switch comprises a second output port and more than one second input port, and the second wavelength-selective switch is configured to combine optical signals inputted from the second input ports into the dense wavelength division multiplexing optical signals, and output the dense wavelength division multiplexing optical signals in an egress direction through the second output port, wherein
   the ingress direction and the egress direction belong to the same optical direction, and the ingress direction and the egress direction are opposite directions.

2. The reconfigurable optical add-drop multiplexer according to claim 1, wherein the reconfigurable optical add-drop multiplexer corresponds to m optical directions, and m−1 first output ports in the first wavelength-selective switch in each optical direction are each connected to one of the second input ports in the second wavelength-selective switch in each of other optical directions in a one-to-one manner.

3. The reconfigurable optical add-drop multiplexer according to claim 1, wherein the filter comprises a downlink input port more than one downlink output port corresponding to the downlink input port, an uplink output port, and more than one uplink input port corresponding to the uplink output port;

the downlink input port is connected to the first output port of the first wavelength-selective switch, the downlink output ports are connected to the upper ports of the optical cross-connect device, and the filter is configured to separate the dense wavelength division multiplexing optical signals that are allocated according to the wavelengths and that are outputted from the first output port into a plurality of single-channel optical signals, and output the single-channel optical signals to the upper ports of the optical cross-connect device through the more than one downlink output port; and the uplink output port is connected to the second input port of the second wavelength-selective switch, the uplink input ports are connected to the upper ports of the optical cross-connect device, and the filter is further configured to multiplex single-channel optical signals inputted from the more than one uplink input port to the same optical channel, and output multiplexed optical signals into the second input port through the uplink output port.

4. The reconfigurable optical add-drop multiplexer according to claim 3, wherein:

the uplink input ports of the filter are connected to the upper ports of the optical cross-connect device in a one-to-one manner; and the downlink output ports of the filter are connected to the upper ports of the optical cross-connect device in a one-to-one manner.

5. An optical network, comprising at least two optical network nodes;

each of the optical network nodes being provided with the reconfigurable optical add-drop multiplexer according to claim 1, the optical network nodes being connected through optical fibers.

6. An optical signal processing method, performed by a reconfigurable optical add-drop multiplexer, the reconfigurable optical add-drop multiplexer comprising at least one optical cross-connect device comprising N upper ports and N lower ports and at least two optical signal processing devices corresponding to different optical directions, the method comprising:

receiving, by a wavelength-selective switch in each optical signal processing device, inputted dense wavelength division multiplexing optical signals;

performing, by the wavelength-selective switch, wavelength-based allocation on the dense wavelength division multiplexing optical signals, and inputting the optical signals after the wavelength-based allocation into a filter in the optical signal processing device;

separating, by the filter, the optical signals after the wavelength-based allocation into single-channel optical signals, and inputting the single-channel optical signals into upper ports of the optical cross-connect device, wherein:

the at least one optical cross-connect device comprise i optical cross-connect devices, i being an integer greater than 1;

the upper ports of each of the optical cross-connect devices are connected to a target quantity of uplink input ports in the filter in a one-to-one manner, and the target quantity of uplink input ports accounts for 1/i of a total of uplink input ports in the filter;

the upper ports of each of the optical cross-connect devices are connected to a target quantity of downlink output ports in the filter in a one-to-one manner, and the target quantity of downlink output ports accounts for 1/i of a total of downlink output ports in the filter;

$N = m \times n \div i$, wherein the reconfigurable optical add-drop multiplexer corresponds to m optical directions and each optical direction corresponds to optical signals of n wavelengths;

the wavelength-selective switch comprises a first wavelength-selective switch and a second wavelength-selective switch;

the first wavelength-selective switch comprises a first input port and more than one first output port, and the first wavelength-selective switch is configured to receive, through the first input port, the dense wavelength division multiplexing optical signals inputted in an ingress direction, and allocate the dense wavelength division multiplexing optical signals to different first output ports according to wavelengths; and the second wavelength-selective switch comprises a second output port and more than one second input port, and the second wavelength-selective switch is configured to combine optical signals inputted from the second input ports into the dense wavelength division multiplexing optical signals, and output the dense wavelength division multiplexing optical signals in an egress direction through the second output port, wherein the ingress direction and the egress direction belong to the same optical direction, and the ingress direction and the egress direction are opposite directions; and dropping, by the optical cross-connect device, the single-channel optical signals through lower ports.

7. The method according to claim 6, wherein the wavelength-selective switch comprises a first wavelength-selective switch, the first wavelength-selective switch comprises a first input port and more than one first output port, and the first output port is connected to the filter;

the receiving, by a wavelength-selective switch in each optical signal processing device, inputted dense wavelength division multiplexing optical signals comprises:

receiving, by the first wavelength-selective switch through the first input port, the dense wavelength division multiplexing optical signals inputted in an ingress direction; and the performing, by the wavelength-selective switch, wavelength-based allocation on the dense wavelength division multiplexing optical signals, and inputting the optical signals after the wavelength-based allocation into a filter in each optical signal processing device comprises:

allocating, by the first wavelength-selective switch, the dense wavelength division multiplexing optical signals to different first output ports according to wavelengths.

8. The method according to claim 7, wherein the filter comprises a downlink input port and more than one downlink output port corresponding to the downlink input port;

the separating, by the filter, the optical signals after the wavelength-based allocation into single-channel optical signals, and inputting the single-channel optical signals into upper ports of the optical cross-connect device comprises:

receiving, by the filter through the downlink input port, the optical signals after the wavelength-based allocation outputted from the first output port; and separating, by the filter, the optical signals after the wavelength-based allocation into more than one single-channel optical signal, and outputting the more than one single-channel optical signal to the upper ports of the optical cross-connect device through the more than one downlink output port.

9. An optical signal processing method, performed by a reconfigurable optical add-drop multiplexer, the reconfigurable optical add-drop multiplexer comprising and at least one optical cross-connect device comprising N upper ports and N lower ports and at least two optical signal processing devices corresponding to different optical directions, the method comprising:

receiving, by the optical cross-connect device through lower ports, more than one single-channel optical signal outputted by an optical transform unit;

inputting, by the optical cross-connect device through upper ports, the more than one single-channel optical signal into a filter in any optical signal processing device;

multiplexing, by the filter, the inputted more than one single-channel optical signal, and inputting multiplexed optical signals into a wavelength-selective switch in the optical signal processing device, wherein:

the at least one optical cross-connect device comprise i optical cross-connect devices, i being an integer greater than 1;

the upper ports of each of the optical cross-connect devices are connected to a target quantity of uplink input ports in the filter in a one-to-one manner, and the target quantity of uplink input ports accounts for 1/i of a total of uplink input ports in the filter;

the upper ports of each of the optical cross-connect devices are connected to a target quantity of downlink output ports in the filter in a one-to-one manner, and the target quantity of downlink output ports accounts for 1/i of a total of downlink output ports in the filter;

N=m×n÷i, wherein the reconfigurable optical add-drop multiplexer corresponds to m optical directions and each optical direction corresponds to optical signals of n wavelengths;

the wavelength-selective switch comprises a first wavelength-selective switch and a second wavelength-selective switch;

the first wavelength-selective switch comprises a first input port and more than one first output port, and the first wavelength-selective switch is configured to receive, through the first input port, the dense wavelength division multiplexing optical signals inputted in an ingress direction, and allocate the dense wavelength division multiplexing optical signals to different first output ports according to wavelengths; and the second wavelength-selective switch comprises a second output port and more than one second input port, and the second wavelength-selective switch is configured to combine optical signals inputted from the second input ports into the dense wavelength division multiplexing optical signals, and output the dense wavelength division multiplexing optical signals in an egress direction through the second output port, wherein the ingress direction and the egress direction belong to the same optical direction, and the ingress direction and the egress direction are opposite directions; and performing, by the wavelength-selective switch, wavelength combination on the multiplexed optical signals and outputting the optical signals.

10. The method according to claim 9, wherein the wavelength-selective switch comprises a second wavelength-selective switch, the second wavelength-selective switch comprises a second output port and more than one second input port, and the filter comprises an uplink output port and more than one uplink input port corresponding to the uplink output port;

the multiplexing, by the filter, the inputted more than one single-channel optical signal, and inputting multiplexed optical signals into a wavelength-selective switch in the optical signal processing device comprises:

multiplexing, by the filter, the single-channel optical signals inputted from the more than one uplink input port into the same optical channel, and outputting, through the uplink output port, the multiplexed optical signals into the second input port of the second wavelength-selective switch; and the performing, by the wavelength-selective switch, wavelength combination on the multiplexed optical signals and outputting the optical signals comprises:

combining, by the second wavelength-selective switch, optical signals inputted from all of the second input ports into dense wavelength division multiplexing optical signals, and outputting the dense wavelength division multiplexing optical signals in an egress direction through the second output port.

* * * * *